US006999762B2

United States Patent
Uchida

(10) Patent No.: US 6,999,762 B2
(45) Date of Patent: Feb. 14, 2006

(54) METHOD AND APPARATUS FOR HANDLING ROAMING LISTS IN A WIRELESS COMMUNICATION SYSTEM

(75) Inventor: Nobuyuki Uchida, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 429 days.

(21) Appl. No.: 10/165,152

(22) Filed: Jun. 5, 2002

(65) Prior Publication Data

US 2004/0203747 A1 Oct. 14, 2004

(51) Int. Cl.
*H04Q 7/20* (2006.01)

(52) U.S. Cl. ............... 455/432.1; 455/432.2; 455/434; 455/435.1; 455/435.2

(58) Field of Classification Search ........... 455/421, 455/422.1, 432.1–432.3, 433, 434, 435.1, 455/435.2

See application file for complete search history.

(56) References Cited

U.S. PATENT DOCUMENTS

| 5,613,204 A | * | 3/1997 | Haberman et al. | 455/432.3 |
| 5,999,811 A | * | 12/1999 | Molne | 455/432.3 |
| 6,044,265 A | * | 3/2000 | Roach, Jr. | 455/419 |
| 6,246,875 B1 | * | 6/2001 | Seazholtz et al. | 455/432.1 |

* cited by examiner

*Primary Examiner*—Temica Beamer
(74) *Attorney, Agent, or Firm*—Philip R. Wadsworth; Thien T. Nguyen; Kam T. Tam

(57) ABSTRACT

Method and apparatus for updating roaming lists. An error handling message is provided when the roaming list protocols within the elements of a system are not compatible. A roaming list format identifier is provided to the remote user identifying the protocol version supported by the network. The roaming list format identifier acts to either request an old version of the protocol or request the current stored format at the remote user. In one embodiment, the old version is the Preferred Roaming List, and the new version is the Extended Preferred Roaming List.

10 Claims, 5 Drawing Sheets

METHOD AND APPARATUS FOR HANDLING ROAMING LISTS IN A WIRELESS COMMUNICATION SYSTEM

BACKGROUND

1. Field

The present invention relates generally to handling roaming lists in a wireless communication system, and more specifically to updating a preferred roaming list and to coordinating different protocol versions between a wireless communication network and remote users.

2. Background

Protocols are regulations that govern the transmission and receipt of information across a data communications link. Protocols are detailed in a set of standards that assures that different network products can work together. Any product using a given protocol should work with any other product using the same protocol. In a wireless communication system, protocols define the various architectural layers of the system. As protocols and standards are revised, those system components using an older version of the protocols and standards may become incompatible with those having newer capabilities. A variety of methods are used to overcome such incompatibility, wherein each fix is specific to a protocol and/or standard.

One area of incompatibility often occurs when protocols governing traditionally voice-dominated communications are expanded to also govern high data rate transmissions. For example, a remote user of one service provider, the home provider, may have access to other service providers, the foreign provider, when outside the service area of the home provider. The process is called roaming, and is facilitated by the use of roaming lists maintained by the remote user. The roaming list is updated by the service provider as the list changes, e.g., a new relationship with another service provider. The format of the roaming list as well as the format of the transmissions to update the roaming list may be specified by protocols in a standard. The addition of high data rate services, or other new services, may require changes in format to the roaming list as well as changes in the method of updating the roaming list. Such revisions to the protocol may cause incompatibility difficulties between the network and remote users. When the protocol revision of the remote user is different from that of the network, the accuracy and availability of the roaming list to the remote user may be jeopardized.

There is, therefore, a need in the art for an efficient procedure to configure, maintain and update preferred roaming lists over different transmission protocol versions in a wireless communication system.

SUMMARY

Embodiments disclosed herein address the above stated needs by providing a method and apparatus for updating roaming lists, wherein a roaming list format identifier is provided to the remote user identifying the protocol version supported by the network. The roaming list format identifier acts to either request an old version of the protocol or request the current stored format at the remote user. In one embodiment, the old version is the Preferred Roaming List, and the new version is the Extended Preferred Roaming List. On receipt of the roaming list format identifier and a configuration request, a remote user receives the roaming list format identifier transmits an error message if the format identifier is not compatible with the protocol version currently used by the remote user. Similarly, the remote user transmits configuration information if the format identifier is compatible with the protocol version used by the remote user. An error handling message is provided when the roaming list protocols within the elements of a system are not compatible.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), (4) the "TIA/EIA-IS-856 CDMA2000 High Rate Packet Data Air Interface Specification" (the IS-856 standard), and (5) some other standards.

Cellular communication system users commonly have a service agreement with a cellular provider. The system operated by a cellular provider may cover a limited geographical area. When a user travels outside of this geographical area, service may be provided by another system operator, under a roaming agreement. There is often more than one service provider in a particular region, so a user may have a choice as to which service provider to roam with. As cellular communication systems have proliferated, networks of cellular systems have been organized under common service providers, or with contractual agreements between service providers. Roaming fees are minimized or eliminated when a user transfers between systems which are party to such agreements. As such, modern mobile stations often make use of Preferred Roaming Lists (PRLs), which contain information about the preferred systems for roaming and various parameters needed for communication therewith. PRLs may be pre-programmed in a mobile station when service is initiated. Alternatively, PRLs can be programmed with over-the-air data transfers. Such programming is described in "TIA/EIA-683-B Over-the-Air Service Provisioning of Mobile Stations in Spread Spectrum Systems", a standard compatible with the above named wireless communication systems.

Figure 1:
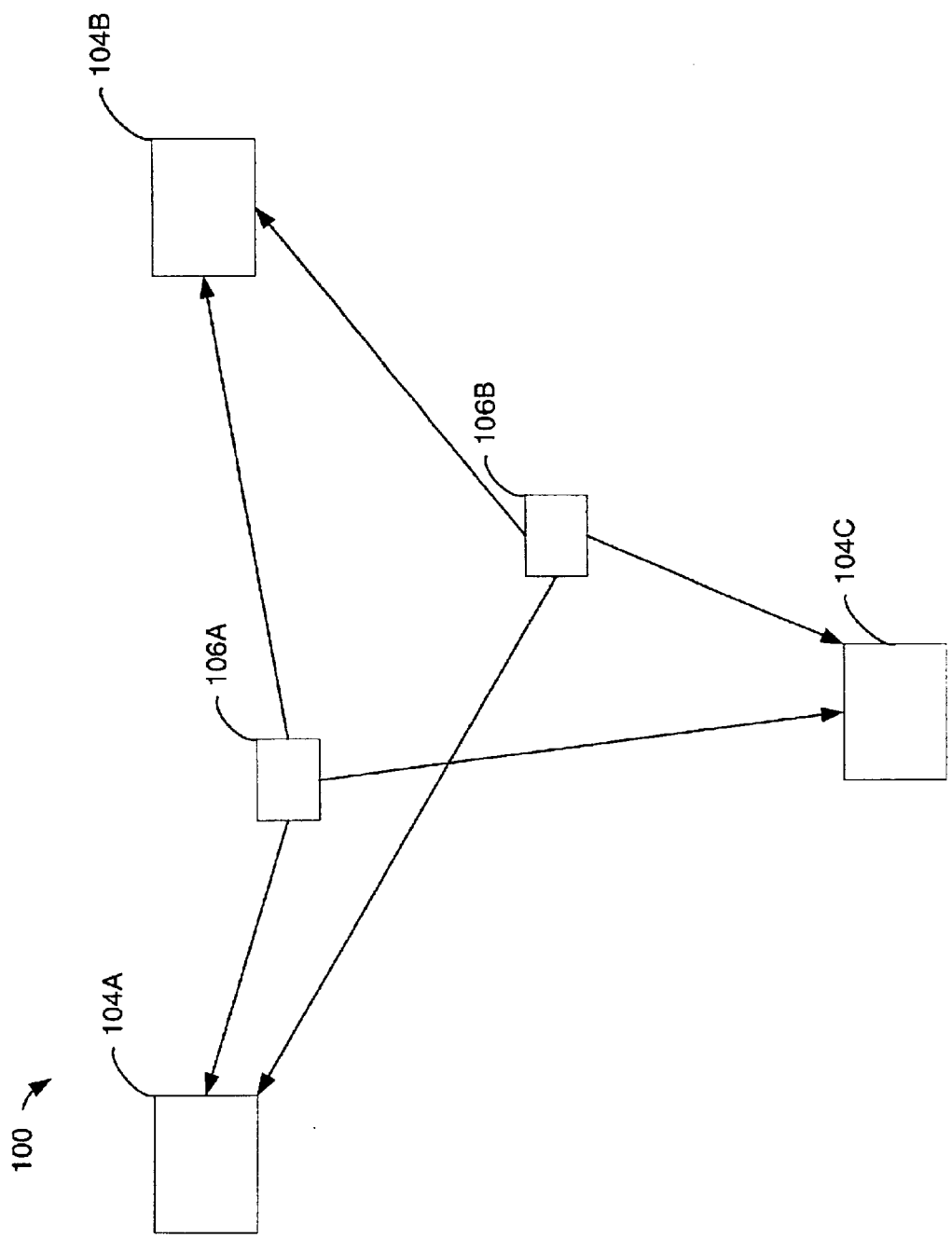
FIG. 1 is a communication system.

FIG. 1 is a diagram of a wireless communication system 100 according to one embodiment that supports a number of users, and which can implement various aspects of the invention. System 100 may be designed to support one or more CDMA standards and/or designs (e.g., the W-CDMA standard, the IS-95 standard, the cdma2000 standard, the IS-856 standard). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station. The word "exemplary" is used exclusively herein to mean "serving as an example, instance, or illustration." Any embodiment described herein as "exemplary" is not necessarily to be construed as preferred or advantageous over other embodiments.

FIGS. 2–5 illustrate roaming list updating for various configurations. For these examples, the systems support the protocols detailed in IS-683-B, and may support newer versions of the protocols. For example, an Extended PRL is supported as a new version of the PRL. The Extended PRL includes information used for high data rate services in addition to the information supported by the PRL. The Extended PRL is expandable for other communication systems.

Figure 2:
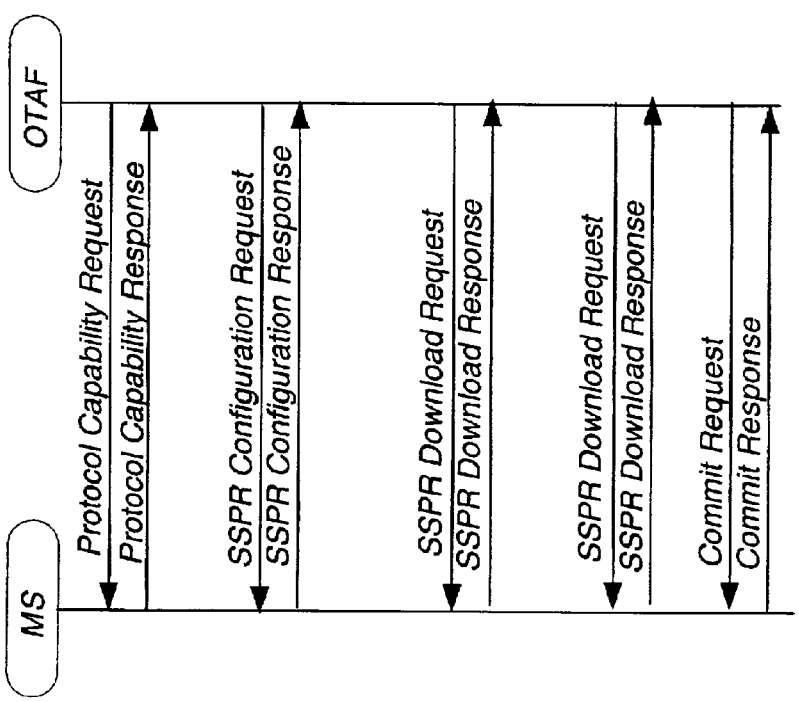

FIG. 2 illustrates call processing wherein both the remote unit or Mobile Station (MS) and the network, identified as Over-The-Air service provisioning Function (OTAF), support an old version Preferred Roaming List (PRL). The OTAF is a network infrastructure element, such as a Base Station (BS) or Base Station Controller (BSC). For clarity, the old version will be referred to as the "PRL," while the new version will be referred to as the "E-PRL." Note that alternate embodiments may implement any of a variety of naming conventions to identify a previous version from a later version of a roaming list. Similarly, alternate embodiments may implement more than two versions. In the scenario of FIG. 2, the OTAF sends a protocol capability request to the MS. The MS responds indicating support for the PRL. The OTAF then sends a System Selection for Preferred Roaming List (SSPR) configuration request message. Accordingly, the SSPR configuration request includes a BLOCK_ID field. The BLOCK_ID field is used to identify the parameter block requested in this message. In this case, the BLOCK_ID field is set to the hexadecimal value 0x00 (or the binary value 0000000) requesting the configuration, i.e., dimensions, of the old version PRL. As the MS only supports the old version PRL, the MS responds with the configuration information of the PRL. The OTAF then determines if there is a need to update the PRL at the MS. If a need exists, then the OTAF downloads the new information for storage in the MS.

Figure 3:
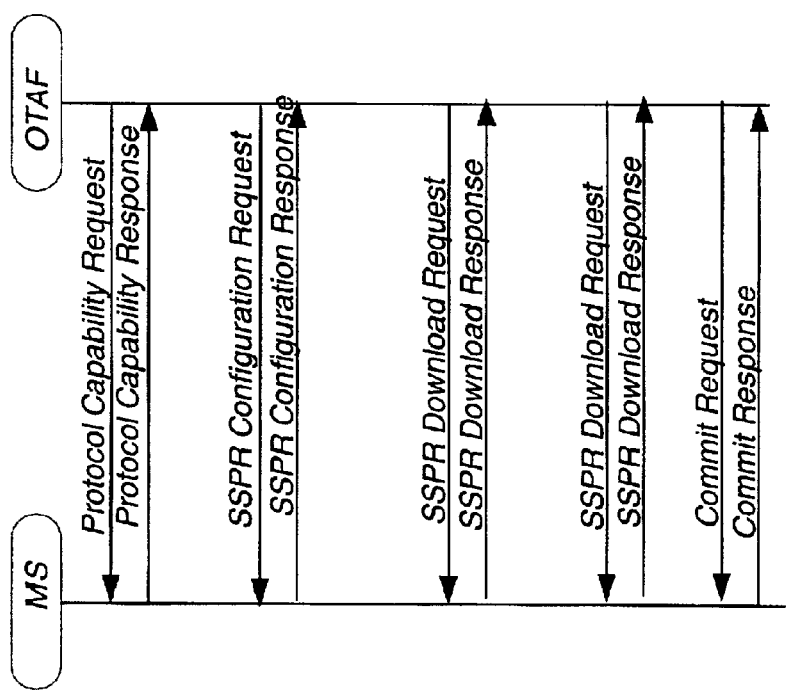
FIGS. 2–5 are timing diagrams illustrating procedures to update a preferred roaming list for various configurations of the remote user and the network.

FIG. 3 illustrates the scenario wherein the OTAF supports E-PRL, while the MS only supports PRL. In this scenario, the OTAF checks the capability of the MS, and in response sends an SSPR configuration request with the BLOCK_ID field set to 0x00 corresponding to the PRL. Note that the OTAF is capable of handling both PRL and E-PRL, and therefore, is able to interface with a MS capable of either. In this case, the MS is only able to support PRL; the OTAF asks for the PRL configuration. The MS responds, and processing continues as in FIG. 2.

Figure 4:
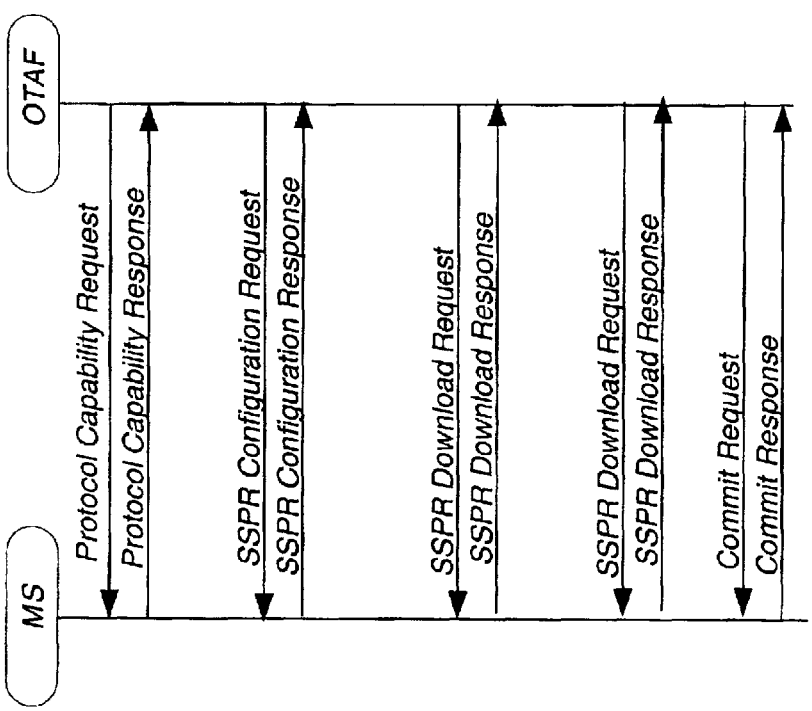

FIG. 4 illustrates the scenario wherein the OTAF supports PRL, while the MS supports both PRL and E-PRL. In this scenario, when the OTAF requests capability information, the MS sends a response identifying support of both PRL and E-PRL. The OTAF cannot handle the E-PRL information. Note that while the MS is able to support both PRL and E-PRL, the MS is only able to support one at a time. The OTAF then requests configuration information. The MS sends the configuration information in response. If the SSPR Configuration Request Message contains the request for the Preferred Roaming List Dimension Parameter Block (BLOCK_ID='00000000') and if the mobile station supports SSPR_P_REV greater than or equal to '00000011' and stores preferred roaming list associated with SSPR_P_REV greater than or equal to '00000011', then, the mobile station shall set the RESULT_CODE in the SSPR Configuration Response Message to '00100011', "Rejected—PRL format mismatch." The mobile station shall include the parameter block with the BLOCK_LEN field set to zero. In other words, if the OTAF supports only the old version, while the MS supports the new version and is currently storing the roaming list in the new format, then the MS sends an error message to the OTAF. If the current roaming list stored in the MS is in the PRL format, the OTAF receives the PRL configuration information and responds accordingly. If, however, the current roaming list in the MS is in the E-PRL format, the OTAF receives configuration information that it cannot process. To avoid such problems, in the present embodiment, the OTAF sends the SSPR configuration request with the BLOCK_ID equal to 0x00, indicating that the OTAF desires to receive the PRL configuration information. In this way, if the MS stores the PRL format, then the PRL configuration is sent to the OTAF. Else, if the MS stores the E-PRL format, the MS sends the SSPR configuration response with an error code to the OTAF. At this point, the OTAF is informed of the compatibility problem, and determines a correction strategy that is implementation specific.

Figure 5:
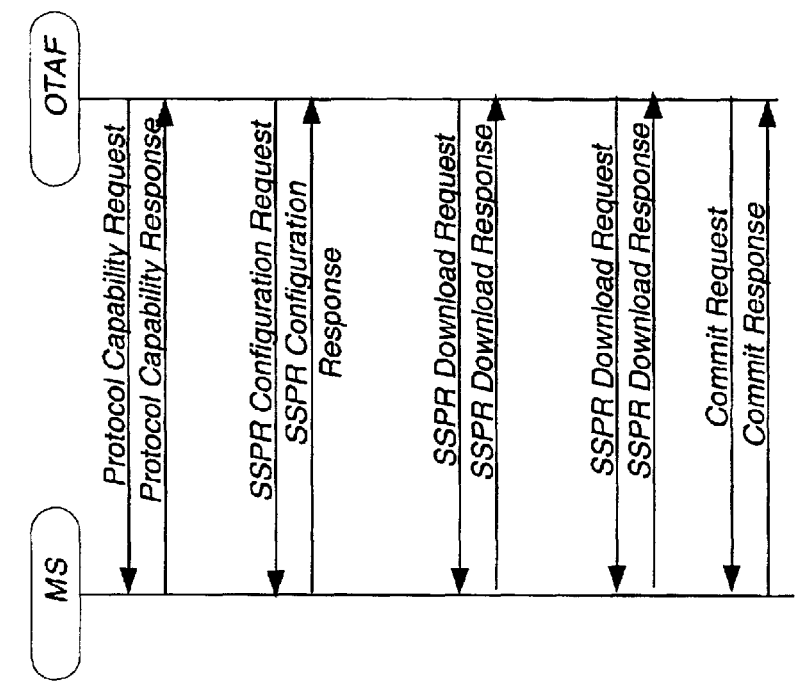

FIG. 5 illustrates a final scenario wherein the OTAF and the MS both support the new version E-PRL. The OTAF determines the capability of the MS and identifies the MS as supporting both PRL and E-PRL. At this point, the OTAF does not know which format is currently stored in the MS. For example, while the MS supports E-PRL, the MS may have changed from a service provider that only supports PRL. The current format of the roaming list in the MS may therefore be PRL or E-PRL. The OTAF desires to update the E-PRL if available. The OTAF sets the BLOCK_ID field in the SSPR configuration request message to 0x02. This indicates to the MS that the OTAF desires SSPR configuration information regarding the current format of the roaming list. The MS responds with the configuration information stored in the MS, the PRL dimensions or E-PRL dimensions, based on the current format.

According to the exemplary embodiment, a MS supporting both the new and old versions uses an extended memory storage area for storing the roaming list. Either format may be stored in the extended memory storage area. Table 1 provides the E-PRL dimensions parameter block as stored in the MS. The PARAM_DATA field of the Extended Preferred Roaming List Dimensions Parameter Block consists of the fields listed.

TABLE 1

Extended Preferred Roaming List Dimensions Parameter Block

| Field | Length (bits) |
|---|---|
| MAX_PR_LIST_SIZE | 16 |
| CUR_PR_LIST_SIZE | 16 |
| PR_LIST_ID | 16 |
| CUR_SSPR_P_REV | 8 |
| SSPR_P_REV-specific fields | variable |
| If CUR_SSPR_P_REV is '00000001' the SSPR_P_REV-specific fields also include the following fields: | |
| RESERVED | 1 |
| NUM_ACQ_RECS | 9 |
| NUM_SYS_RECS | 14 |
| If CUR_SSPR_P_REV is '00000011' the SSPR_P_REV-specific fields also include the following fields: | |
| NUM_ACQ_RECS | 9 |
| NUM_COMMON_SUBNET_RECS | 9 |
| NUM_EXT_SYS_RECS | 14 |

The following definitions explain the various fields listed in Table 1.
MAX_PR_LIST_SIZE—Maximum preferred roaming list size.
The mobile station sets this field to the maximum size, in octets, that the mobile station can support for the preferred roaming list (PR_LIST$_{s-p}$).
CUR_PR_LIST_SIZE—Current preferred roaming list size.
The mobile station sets this field to the size, in octets, of the current preferred roaming list.
PR_LIST_ID—Preferred Roaming List Identification.
The mobile station sets this field to the value of the Preferred Roaming List Identification assigned for the preferred roaming list (PR_LIST$_{s-p}$) by the base station.
CUR_SSPR_P_REV—Protocol revision of the mobile station's current preferred roaming list.
The mobile station sets this field to the value of the SSPR_P_REV associated with its current preferred roaming list.
RESERVED—Reserved bit.
The mobile station sets this field to '0'.
NUM_ACQ_RECS—Number of acquisition records.
The mobile station sets this field to the number of acquisition records contained in the ACQ_TABLE field of the current preferred roaming list.
NUM_SYS_RECS—Number of system records.
The mobile station sets this field to the number of system records contained in the SYS_TABLE field of the current preferred roaming list.
NUM_COMMON_SUBNET_RECS—Number of records in the Common Subnet Table.
This field is set to the number of records contained in the Common Subnet Table.
NUM_EXT_SYS_RECS—Number of extended system records.
The mobile station sets this field to the number of extended system records contained in the EXT_SYS_TABLE field of the current preferred roaming list.

Figure 6:
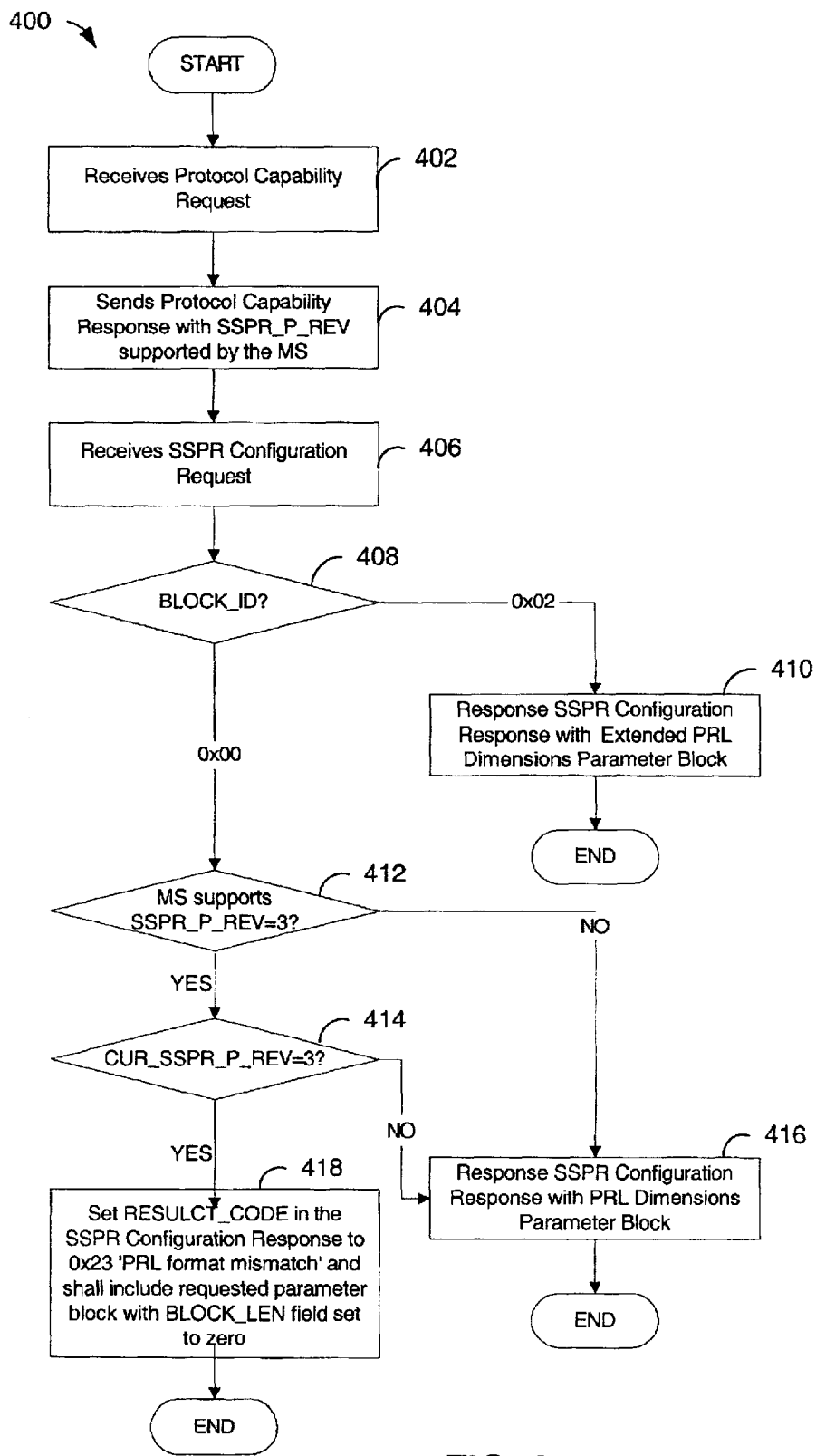
FIG. 6 is a flow diagram of a method for updating a preferred roaming list.

FIG. 6 is a flow diagram illustrating a process for updating roaming lists according to one embodiment. As illustrated, the process 400 begins by the MS receiving a capability request message at step 402. The MS responds by sending the capability information at step 404. At step 406 the MS receives the configuration request message from the OTAF. The configuration request message includes a BLOCK_ID field. Based on the value in the BLOCK_ID field, the MS determines the appropriate response, decision diamond 408. If the OTAF requests current information as to which format the MS is currently using for the roaming list, processing continues to step 410. The MS sends back the configuration information of the current roaming list stored. If the BLOCK_ID requests PRL configuration information and the MS do not support E-PRL, then processing continues to step 416 to send the PRL configuration information to the OTAF. If the BLOCK_ID requests PRL configuration information and the MS do support E-PRL, then the MS determines in which format (PRL or E-PRL) the roaming list is currently stored. If the list is stored in PRL format, processing continues to step 416. Else if the list is stored in E-PRL format, processing continues to step 418 to send a response message with error code to the OTAF.

Figure 7:
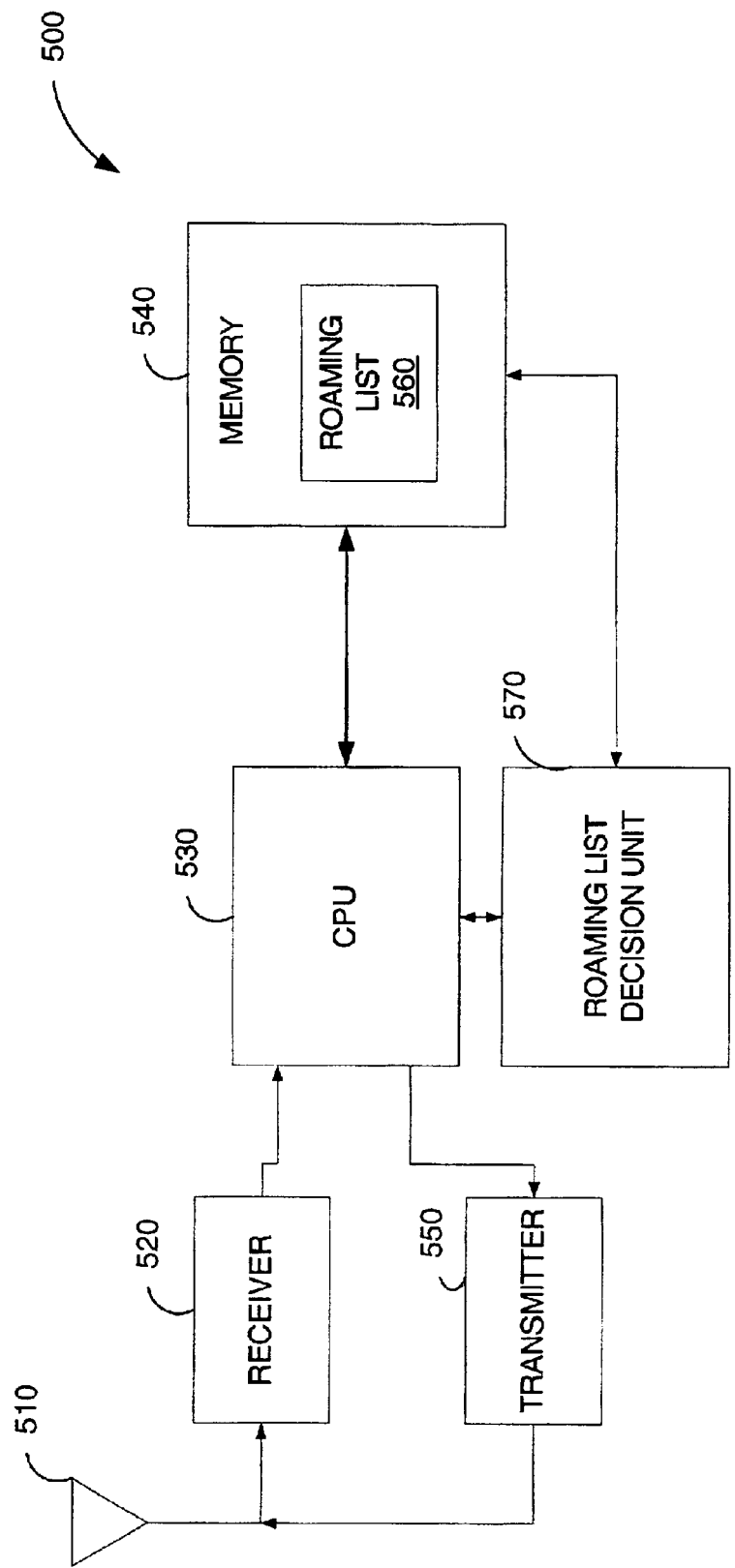
FIG. 7 is a mobile station.

FIG. 7 shows an embodiment of mobile unit 500. For clarity, only a subset of the components is shown. Signals are received at antenna 510, and delivered to receiver 520 where amplification, down-conversion, sampling, and demodulating takes place. Various techniques for receiving CDMA signals are known in the art. In addition, the principles of the present invention apply with equal force to wireless communication systems deploying air interfaces other than those based on CDMA. Receiver 520 is in communication with a central processing unit (CPU) 530. CPU 530 may be a microprocessor or digital signal processor (DSP), or one of various processors known in the art. CPU 530 communicates with memory 540, which is shown containing roaming list 560. The roaming list 560 can be programmed via over-the-air programming in conjunction with antenna 510 and receiver 520, or the data for the roaming list may come in from other inputs to CPU 530 (not shown). CPU 530 is also connected to transmitter 550, for transmitting messages, data, voice, etc., using any of the techniques for transmission known in the art. Transmitter 550 is connected to antenna 510, for transmission to a base station, such as base station 104. Receiver 520 and transmitter 550, in conjunction with antenna 510, can be used to communicate with one or more systems identified in the roaming list 560 when the mobile station is roaming. The mobile unit 500 is a hybrid unit supporting both PRL and E-PRL. The memory storage locations of the PRL 560 may be used to store the E-PRL information as well. Roaming list decision unit 570 receives a roaming list format identifier, such as the information contained in the BLOCK_ID as discussed hereinabove. The roaming list decision unit 570 then determines the appropriate response as detailed in the process of FIG. 6. The roaming list decision unit 570 also controls roaming list storage in roaming list 560. The roaming list decision unit 570 provides the configuration information to the CPU 530 for transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for updating a roaming list in a mobile station storing a roaming list in a first format selected from one of a Preferred Roaming List format indicative of a first protocol version and an Extended Preferred Roaming List format indicative of a second protocol version, comprising:
   receiving a roaming list format identifier that identifies a protocol version supported by a network, wherein the roaming list format identifiers allow the mobile station to request either the Preferred Roaming List format or the Extended Preferred Roaming List format stored at the mobile station;
   transmitting an error message if the format identifier is not compatible with the first format; and
   transmitting configuration information of the first format if the format identifier is compatible with the first format.

2. The method as in claim 1, wherein the configuration information includes the dimensions of the first format.

3. The method as in claim 1, further comprising:
   receiving updates to the roaming list if the format identifier is compatible with the first format.

4. A method for updating a roaming list, the method comprising:
   receiving protocol capability information;
   determining a roaming list format identifier based on the protocol capability information, wherein the roaming list format identifier identifies a protocol version sunported by a network, wherein the roaming list format identifier allows a mobile station to request either a Preferred Roaming List format or an Extended Preferred Roaming List format stored at the mobile station; and
   transmitting a System Selection Preferred Roaming (SSPR) configuration request including the roaming list format identifier in a BLOCK ID field.

5. The method as in claim 4, further comprising:
   in response to the System Selection Preferred Roaming (SSPR) configuration request, receiving configuration information;
   determining a roaming list format for roaming list updates based on the configuration information; and
   transmitting roaming list updates in the roaming list format.

6. The method as in claim 4, wherein the roaming list format identifier is a first value for a first version roaming list protocol.

7. The method as in claim 6, wherein the roaming list format identifier is a second value for a second version roaming list protocol.

8. The method as in claim 5, wherein the roaming list format identifier is a second value for a second version roaming list protocol.

9. A mobile station, the mobile station storing a roaming list in a first format selected from one of a Preferred Roaming List format indicative of a first protocol version and an Extended Preferred Roaming List format indicative of a second protocol version, comprising:
   means for receiving a roaming list format identifier that identifies a protocol version supported by a network, wherein the roaming list format identifiers allow the mobile station to request either the Preferred Roaming List format or the Extended Preferred Roaming List format stored at the mobile station;
   means for transmitting an error message if the format identifier is not compatible with the first format; and
   means for transmitting configuration information of the first format if the format identifier is compatible with the first format.

10. A wireless communication infrastructure element, comprising:
    means for receiving protocol capability information;
    means for determining a roaming list format identifier based on the protocol capability information, wherein the roaming list format identifier identifies a protocol version supported by a network, wherein the roaming list format identifier allows the mobile station to request either a Preferred Roaming List format or an Extended Preferred Roaming List format stored at the mobile station; and
    means for transmitting a System Selection Preferred Roaming (SSPR) configuration request including the roaming list format identifier in a BLOCK ID field.

* * * * *